(12) United States Patent
Taniguchi (10) Patent No.: US 6,456,730 B1
(45) Date of Patent: Sep. 24, 2002

(54) MOVING OBJECT DETECTION APPARATUS AND METHOD

(75) Inventor: Yasuhiro Taniguchi, Osaka-fu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/334,948

(22) Filed: Jun. 17, 1999

(30) Foreign Application Priority Data

Jun. 19, 1998 (JP) .......................................... 10-172837

(51) Int. Cl.[7] .................................................. G06K 9/00
(52) U.S. Cl. ...................................... 382/107; 382/103
(58) Field of Search ................................ 382/107, 104, 382/103, 157; 348/222, 363, 169; 340/435, 904, 991, 903, 937

(56) References Cited

U.S. PATENT DOCUMENTS 5,243,663 A  *  9/1993  Kudoh .................... 348/932.2
5,282,045 A  *  1/1994  Mimura et al. ............. 358/227
5,889,878 A  *  3/1999  Togashi ...................... 382/103
6,141,435 A  * 10/2000  Naoi et al. .................. 382/104

FOREIGN PATENT DOCUMENTS

JP          7-110864        4/1995

OTHER PUBLICATIONS

Murray et al., "Motion Tracking with an Active Camera," IEEE Transactions on Pattern Analysis and Machine Intelligence, vol. 16, No. 5, May 1994, pp. 449–459.

* cited by examiner

Primary Examiner—Andrew W. Johns
Assistant Examiner—Seyed Azarian
(74) Attorney, Agent, or Firm—Finnegan, Henderson, Farabow, Garrett & Dunner, L.L.P.

(57) ABSTRACT

A plurality of images are inputted in time series. A vanishing point detection section detects a vanishing point at which a plurality of lines substantially concentrate from each input image. A concentration line elimination section eliminates the plurality of lines from the each input image according to a position of the vanishing point. A moving object detection section detects a moving object from the each input image in which the plurality of lines are eliminated.

22 Claims, 12 Drawing Sheets

WHITE LINE CANDIDATE

SEARCH AREA OF WHITE LINE CANDIDATE

IMAGE (t)

FIG. 10B

IMAGE (t+1)

FIG. 11

| SEARCH CANDIDATE BLOCK \ INPUT TIMING OF IMAGE | $t_0-10$ | MOVING QUANTITY | $t_0-9$ | ... | $t_0-1$ | MOVING QUANTITY | $t_0$ | |
|---|---|---|---|---|---|---|---|---|
| $B_1$ | POSITION $(x_{10}, y_{10})$ | $(\ell_9, m_9)$ | POSITION $(x_9, y_9)$ | ... | POSITION $(x_1, y_1)$ | $(\ell_0, m_0)$ | POSITION $(x_0, y_0)$ | |
| $B_2$ | POSITION $(x_{10}', y_{10}')$ | $(\ell_9', m_9')$ | POSITION $(x_9', y_9')$ | ... | POSITION $(x_1', y_1')$ | $(\ell_0', m_0')$ | POSITION $(x_0', y_0')$ | |

MOVING OBJECT OF
ACCUMULATED MOVING
QUANTITY "20"

MOVING OBJECT OF
ACCUMULATED MOVING
QUANTITY "10"

MOVING OBJECT DETECTION APPARATUS AND METHOD

FIELD OF THE INVENTION

The present invention relates to a moving object detection apparatus and a method to correctly extract a moving object from a plurality of input images in a time series.

BACKGROUND OF THE INVENTION

In the background art, several methods for detecting the moving object from time series images are known. In this case, for example, the moving object is a car moving straightly along a road. In case the moving object and a background are taken by a camera, as methods for detecting the moving object from the input image, the following several methods are considered.

(1) The input image is transformed using motion tracking. The correspondence of a predetermined area between time series images is detected in order to extract only the moving object as the predetermined area. (D. Murray, A. Basu "Motion Tracking with an Active Camera"

(2) A plurality of notice points are located on the image and an area whose peak points are the plurality of notice points is defined. The correspondence of the area between time series images is searched. The affine transformation parameter between the time series image is determined by two steps in order to extract the moving object.

(3) A two-dimensional Laplacian filter is calculated in a moving vector space. The output value is processed by a threshold in order to extract the moving object (Japanese Patent Disclosure (Kokai) PH7-110864).

In the above-mentioned three methods, the background, as the greatest part of the image, is separated from the moving object as another part. However, if the camera is moving along an optical axis direction, movement of the background is not uniformly detected. As a result, the moving object is not correctly detected. Furthermore, while the camera is moving along the optical axis direction, the size of the moving vector of the background is not fixed. Accordingly, a threshold to discriminate a direction or size of a moving vector of the moving object from the image is not determined.

In case the camera moving along the optical axis direction inputs the image including the moving object and the background, the moving vector of the background caused by movement of the camera are generated toward a direction of a vanishing point. Therefore, a part whose moving vector is different from the background is detected as the moving object. However, it often happens that a plurality of edges whose direction is the same as the moving vector of the background are included in the image. A line consisting of the plurality of edges is called a concentration line such as a white line. In this case, the moving vector of the edges is not correctly determined because of an aperture problem.

The "Vanishing point" is defined as a point to which a plurality of parallel lines in three-dimensional scene are concentrated in the image in case of the fixed camera. The "Concentration line" is defined as the parallel line concentrated to the vanishing point, for example, the white line on the road or the edges of guardrail. In the following explanation, the concentration line is called the white line.

For example, assume that while a car carrying the camera moves along a direction of the white line on the road, the camera inputs the images for a scene behind the car in a time series. The characteristic quantity of the input image includes not only edges of a rear moving car but also the white lines on the road. This white line extends toward the vanishing point generated by movement of the camera car in the time series images. In this case, it is difficult to determine the moving direction of the white line in the image. As a result, the moving object is not correctly extracted from the image.

SUMMARY OF THE INVENTION

It is an object of the present invention to provide a moving object detection apparatus and a method to correctly detect the moving object from the image if the camera loaded on the car inputs the rear scene including the moving object and the road.

According to the present invention, there is provided a moving object detection apparatus, comprising: image input means for inputting a plurality of images in a time series; vanishing point detection means for detecting a vanishing point to which a plurality of concentration lines are concentrated from each input image; concentration line elimination means for eliminating the plurality of concentration lines from the each input image according to a position of the vanishing point; and moving object detection means for detecting a moving object from each input image in which the plurality of concentration lines are eliminated.

Further, in accordance with the present invention, there is also provided a moving object detection method comprising the steps of: inputting a plurality of images in a time series; detecting a vanishing point to which a plurality of concentration lines are concentrated from each input image; eliminating the plurality of concentration lines from the each input image according to a position of the vanishing point; and detecting a moving object from each input image in which the plurality of concentration lines are eliminated.

Further in accordance with the present invention, there is also provided a computer readable memory containing computer readable instructions, comprising: instruction means for causing a computer to input a plurality of images in time series; instruction means for causing a computer to detect a vanishing point to which a plurality of concentration lines are concentrated from each input image; instruction means for causing a computer to eliminate the plurality of concentration lines from each input image according to a position of the vanishing point; and instruction means for causing a computer to detect a moving object from each input image in which the plurality of concentration lines are eliminated.

DETAILED DESCRIPTION OF THE PREFERRED EMBODIMENT

Figure 1:
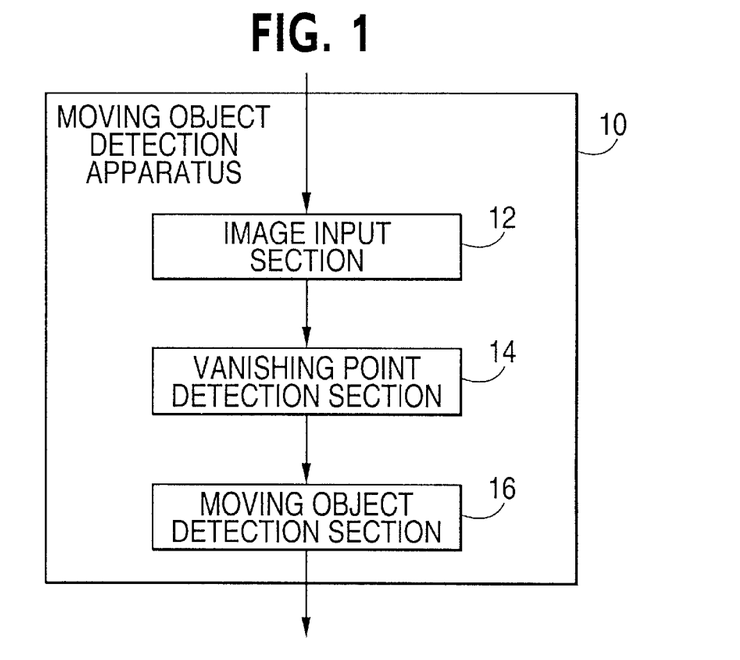
FIG. 1 is a block diagram of the moving object detection apparatus according to the present invention.

FIG. 1 is a block diagram of the moving object detection apparatus 10 according to the present invention. The moving object detection apparatus 10 detects the moving object from the time series images, which includes an image input section 12, a vanishing point detection section 14, a moving object detection section 16. The image input section 12 inputs a plurality of images in a time series as the scene including the moving object and the road. The plurality of images (time series images) are supplied to the vanishing point detection section 14. The vanishing point detection section 14 detects the white lines in the time series images, and calculates the vanishing point to which the white lines are concentrated. The time series image and position data of the vanishing point are supplied to the moving object detection section 16.

Figure 2:
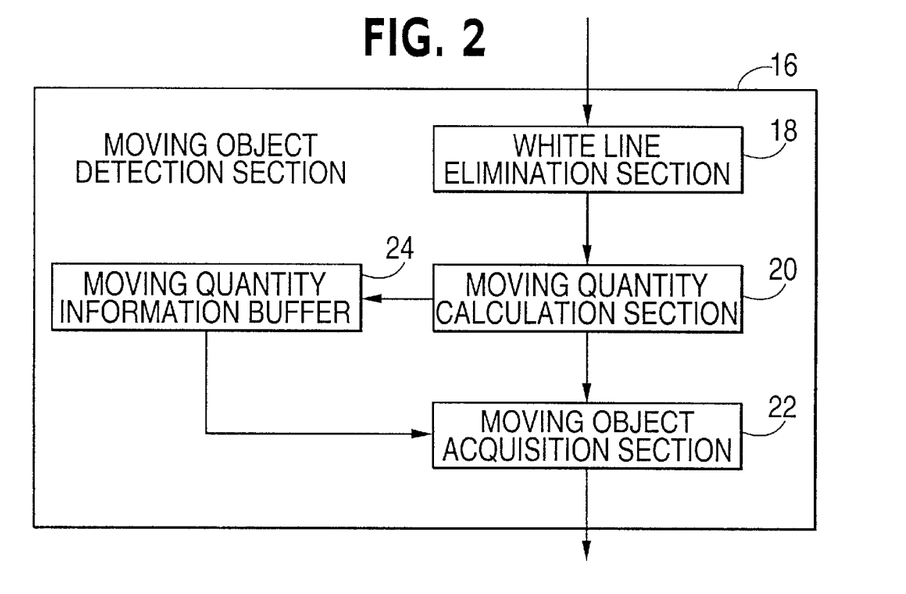
FIG. 2 is a block diagram of a moving object detection section in FIG. 1.

As shown in FIG. 2, the moving object detection section 16 includes a white line elimination section 18, a moving quantity calculation section 20, a moving object acquisition section 22 and a moving quantity information buffer 24. All four sections are not always necessary. According to the input scene, the white line elimination section may be omitted. The white line elimination section 18 examines characteristics of spoke-like lines based on the vanishing point and eliminates edges whose direction are the same as the spoke-like lines from the image. This processed image is supplied to the moving quantity calculation section 20. The moving quantity calculation section 20 sets an area of initial detection on the processed image, divides the area into a plurality of blocks, and detects the moving quantity of each block in the time series images.

Furthermore, the moving quantity calculation section 20 detects the moving quantity of an area of initial detection set from previous images. This detected information of the moving quantity is stored in the moving quantity information buffer 24. The moving object acquisition section 22 determines an interval to accumulate the moving quantity according to a position of the area in the image and accumulates the moving quantity of each block included in the area for the interval. An area consisting of the blocks whose accumulated moving quantity is large is detected as the moving object from the image.

As mentioned-above, the image input section 12 is a camera moving straight along the white line on the road (TV camera on a moving car), and inputs the time series images for the moving object behind the camera car on the road. The moving object is, for example, a moving car, the road, or the billboard. It is not necessary to attach a special color or mark for detection of the moving object.

Figure 3A:
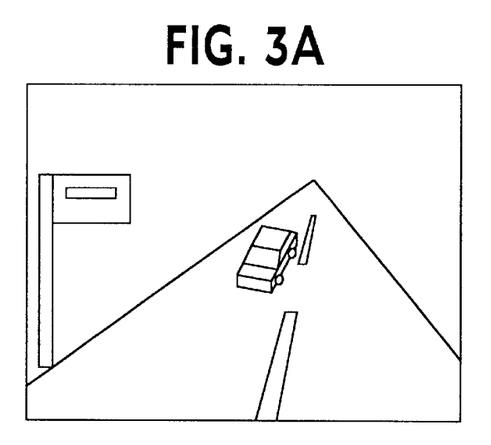
FIGS. 3A, 3B, 3C are respectively schematic diagram of examples of an input image (t), an input image (t+1), and a difference image between the input images (t) (t+1).
Figure 3B:
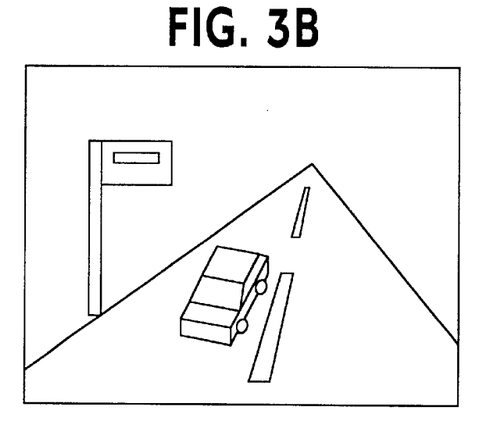
Figure 3C:
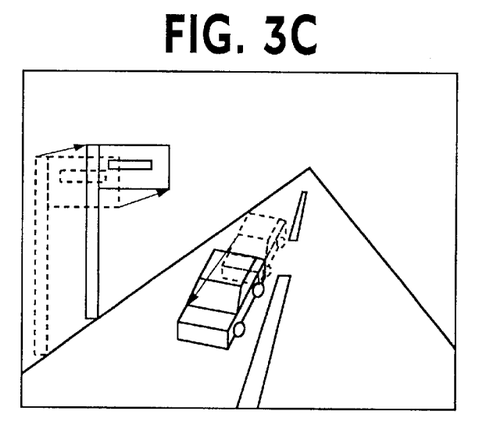

Next, processing of the moving object detection apparatus 10 is explained in detail. Assume that a car moving behind the camera car on the road is the moving object (rear moving car). The image input section 12 inputs a first image at timing (t) as shown in FIG. 3A, and inputs a second image at timing (t+1) as shown in FIG. 3B. FIG. 3C shows a difference image between the first image and the second image. As shown in FIGS. 3A and 3B, the time series images include the white line on the road in addition to the moving car. The white line must be correctly separated from the moving car in the image. In general, the white line consists of a plurality of parallel lines whose intensity value is high on the road. Based on this fact, the white lines existing on the road are roughly detected and the vanishing point is detected as a cross point of the white lines.

Figure 4:
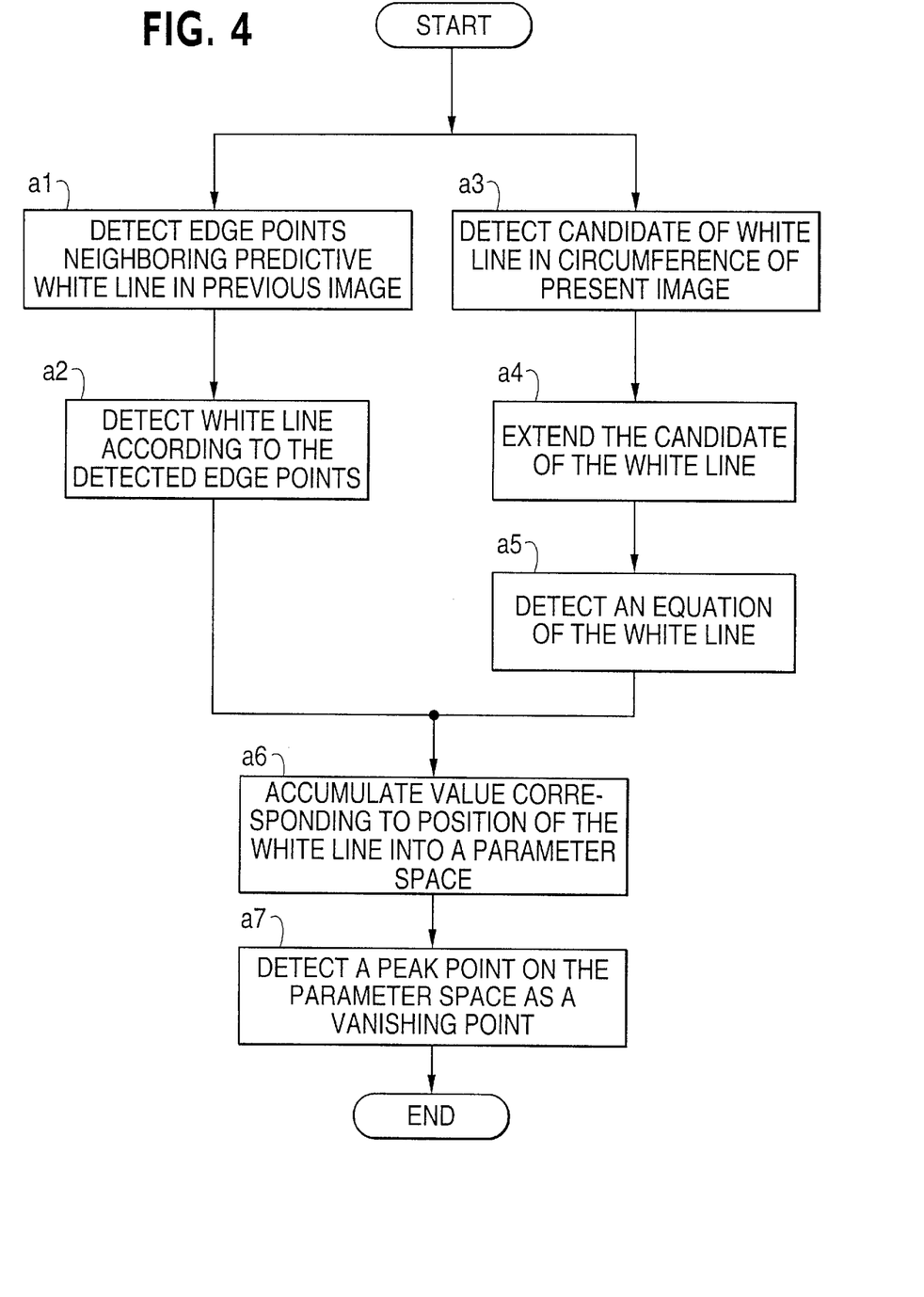
FIG. 4 is a flow chart of the processing of a vanishing point detection section in FIG. 1.
Figure 5A:
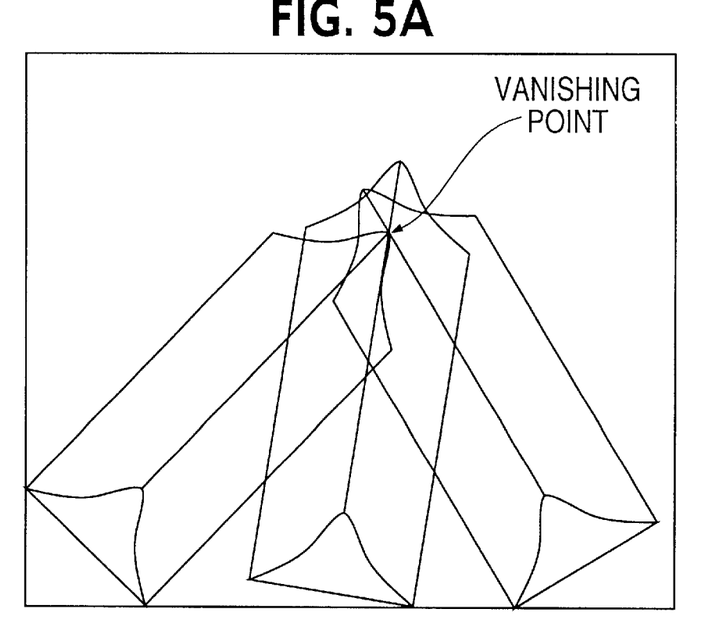
FIGS. 5A and 5B are schematic diagrams of a parameter space to accumulate value of candidate of the white line.

FIG. 4 is a flow chart of the processing of the vanishing point detection section 14. In the time series images, based on a position of the white line detected from the previous image, the white line neighboring the position is searched in the present image. Concretely speaking, based on a straight line approximate equation of the white line calculated in the previous image, a plurality of edge points whose distance from the straight line is below a threshold are extracted from the present image (step a1). The plurality of edge points are approximated as a straight line by a method of least squares. If an error between the previous straight line and the present straight line is below a threshold, the present straight line is regarded as the white line in the present image (step a2). In this case, a value corresponding to the position of the approximated straight line is accumulated to a parameter space as shown in FIG. 5A. In order to exclude the effect of detection error, the value is accumulated so that a normal distribution of the accumulated value is formed along a vertical direction of the approximated straight line.

Figure 6:
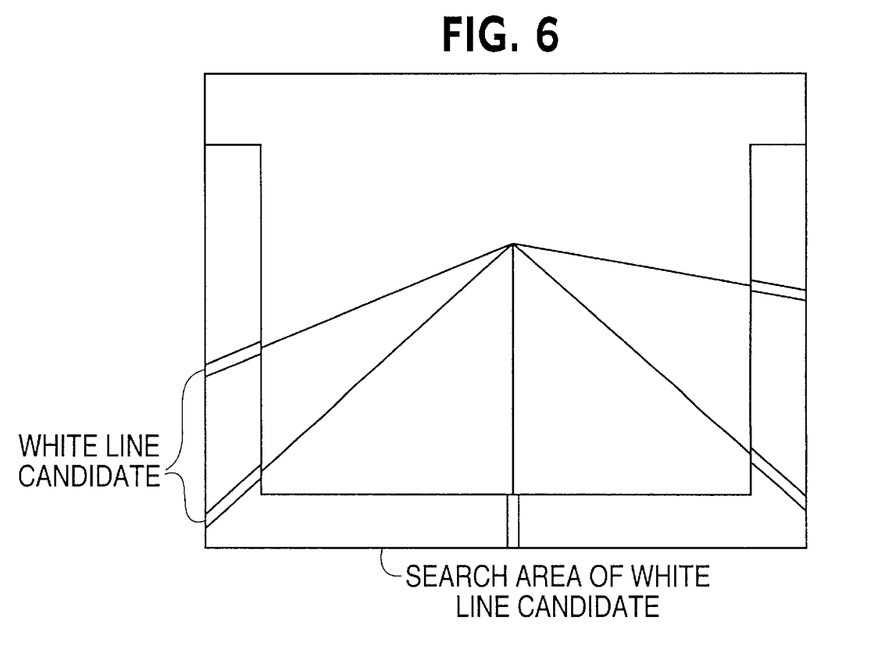
FIG. 6 is a schematic diagram of a circumference area of the white line in the image.

On the other hand, in order to detect a new white line from the present input image, a white line candidate is searched from a circumference part (search area) in the present input image as shown in FIG. 6. The white line candidate is an edge line including strong contract and brightness (step a3). As for each white line candidate in the circumference part, a slope of the white line candidate is calculated.

Figure 7:
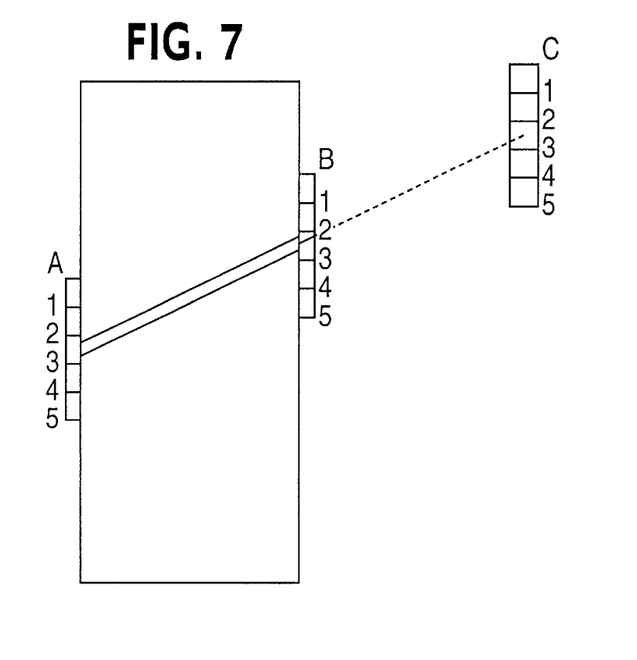
FIG. 7 is a schematic diagram of the extended line based on edges in the circumference area in the image.

As shown in FIG. 7, the white line candidate is extended according to the slope and edges detected on the extended line segment (step a4). By repeating this process, rough positions of the edges on the straight line are detected.

Figure 5B:
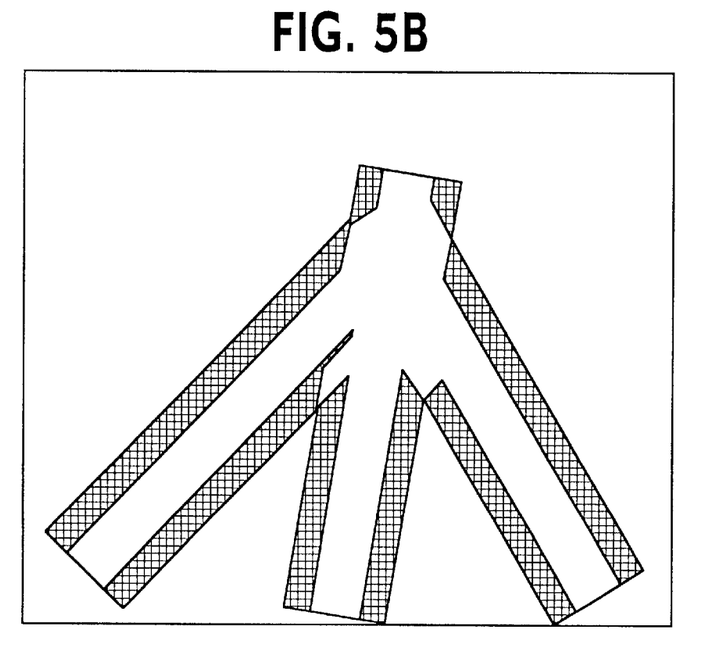

Next, an equation of the straight line linked between a start edge point and an end edge point is calculated (step a5). Based on the equation of the straight line, a value corresponding to the position of the straight line is selected (accumulated) as the parameter space as shown in FIG. 5B (step a6). After accumulation of the value for all straight lines is completed, a peak position corresponding to the largest accumulated value is extracted from the parameter space as the vanishing point (step a7).

In the above-mentioned explanation, in order to detect the vanishing point, the value is accumulated onto the parameter space for both the white line previously detected from the previous image and the white line newly detected from the present image. However, if a position of the camera for the road does not change greatly, the position of the white line is predictable in time series images. By searching the area neighboring the predicted position in the image, the white line is extracted as the area of high brightness value. In this case, the cross point of the white lines is calculated as the vanishing point by using a method of least squares. Furthermore, if the change of the position of the camera for the road is very little, the value of the vanishing point is previously calculated by parameter of the camera. This value is used as the output of the vanishing point detection section.

If the vanishing point is determined in the image, all white lines are radially extended from the vanishing point in the image. Therefore, if the white line passes each pixel in the image, a slope of the white line at the pixel is equal to a slope of straight line between the pixel and the vanishing point in the image. In short, if the vanishing point is determined, a theoretical value of the slope of the white line at each pixel is calculated.

In the above-mentioned explanation, the white line is calculated as a straight line. However, the straight line in the three-dimensional scene happens to appear as a non-straight line in the image because of lens distortion. In this case, a distortion parameter of the lens is calculated by a test image of the matrix scene. After the image is corrected using the distortion parameter, the now straight white line is extracted from the corrected image.

Figure 8:
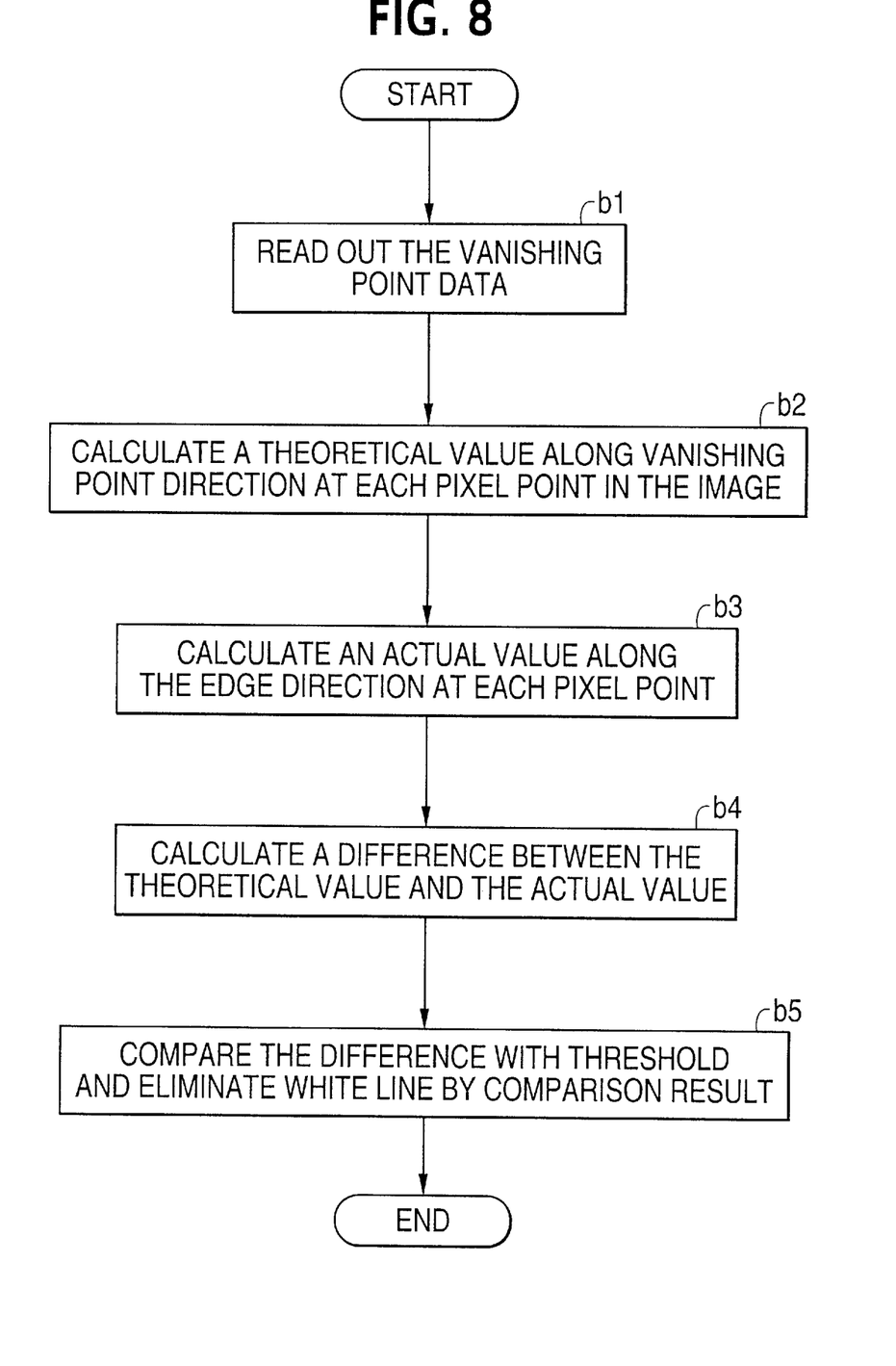
FIG. 8 is a flow chart of the processing of a white line elimination section in FIG. 2.

FIG. 8 is a flow chart of the processing of the white line elimination section 18. After reading out the vanishing point data, the theoretical value of the slope of the white line is calculated for each pixel position in the image (step b1, b2). Next, by using a sobel filter to extract the image feature, an actual value of the slope of the edge is calculated for each pixel position in the image (step b3). If a difference between the theoretical value and the actual value is below a threshold (step b4), the edge of the pixel is determined to be the edge of the white line and eliminated (step b5). In this method, the edge of the moving object such as the car is erroneously eliminated. However, the moving object includes not only edges parallel to the white line but also edges perpendicular to the white line. Therefore, it is not a serious problem in the extraction of the moving object. If all edge elements of the white line are eliminated from the image, edge elements remaining in the image represent the moving object and the background except for the white line. Therefore, the moving object is easily extracted from the image.

Figure 9:
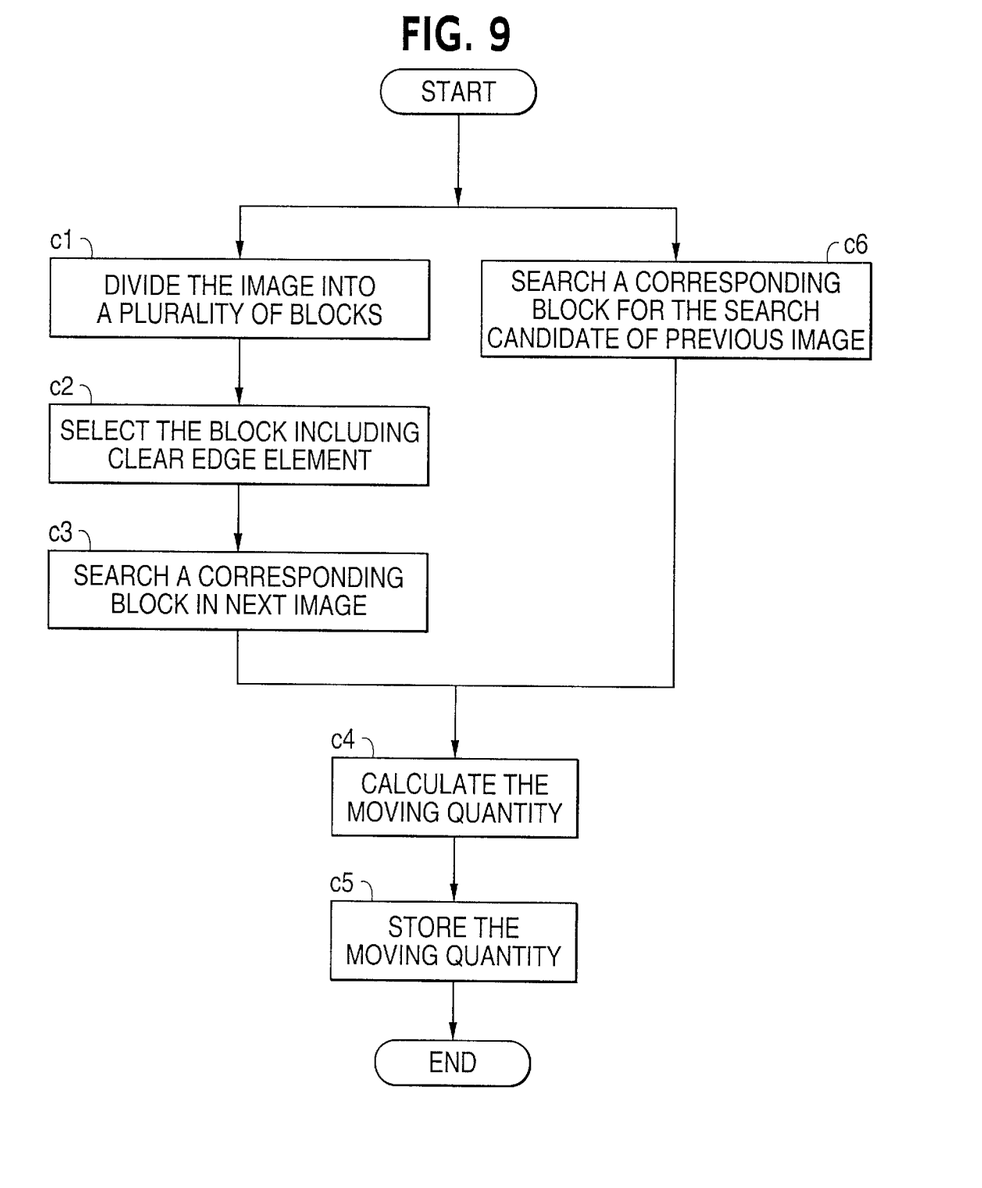
FIG. 9 is a flow chart of the processing of a moving quantity calculation section in FIG. 2.

FIG. 9 is a flow chart of the processing of the moving quantity calculation section 20. First, an initial search area is set on the image from which the white line is eliminated according to a position of the vanishing point, and the initial search area is divided into a plurality of blocks (step c1). Each block is N×N pixels (for example, N=5).

Next, it is determined whether each block includes a clear edge element. The block including the clear edge element is selected as a search candidate block (step c2). As mentioned-above, edge elements in the image represent the car or the background except for the white line because the edges of the white line are eliminated. Therefore, most of the edges of the car are included in the search candidate blocks.

Figure 10A:
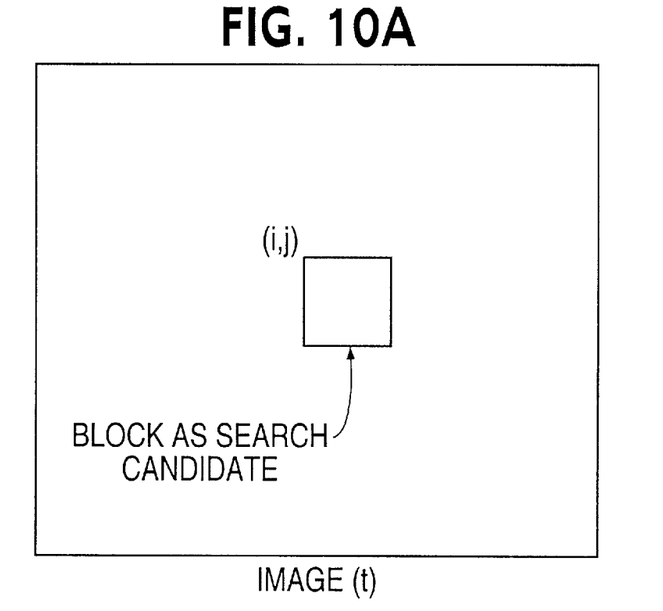
FIGS. 10A and 10B are respectively schematic diagram of a selected block in the image (t) and a search area in the image (t+1).
Figure 10B:
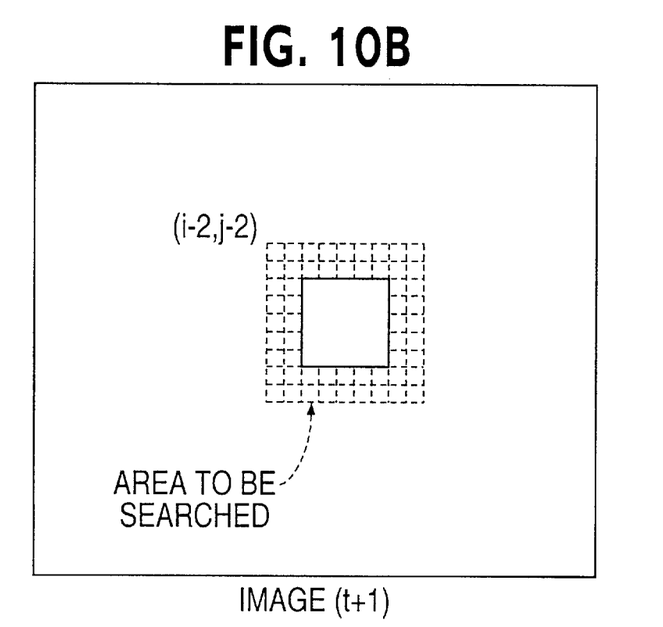

Next, as for each search candidate block, a search area corresponding to a position of the search candidate block is set in next input image (step c3). For example, as for the search candidate block whose left upper coordinate is (i, J) on the image (t) as shown in FIG. 10A, the area whose left upper coordinate is (i–2, j–2) is set on the image (t+1) as shown in FIG. 10B. Then, a block corresponding to the search candidate block is searched in the area of the image (t+1). In this case, a block whose pixel values or edge elements are equal to the search candidate block is searched from the area of the image (t+1) while shifting a position of the block in the area by unit of one pixel.

If the camera fixed on the moving car inputs the image behind this car, and an optical axis of the camera is parallel to the ground of the road, the movement of the rear car on the road includes many horizontal elements (X-direction) and few vertical elements (Y-direction). Accordingly, the area to be searched in the image (t+1) is limited to an oblong area. If the moving object is limited to other cars over taking the camera car on the road, the search area at left side of the vanishing point exists along minus direction of X axis based on position of the search candidate block in the image (t+1). In this case, searching is executed along both the plus and minus directions of the X axis in order to increase the brightness of correspondence. During the searching, a block largely corresponding to the minus direction is extracted as a corresponding block in the image (t+1).

Figure 11:
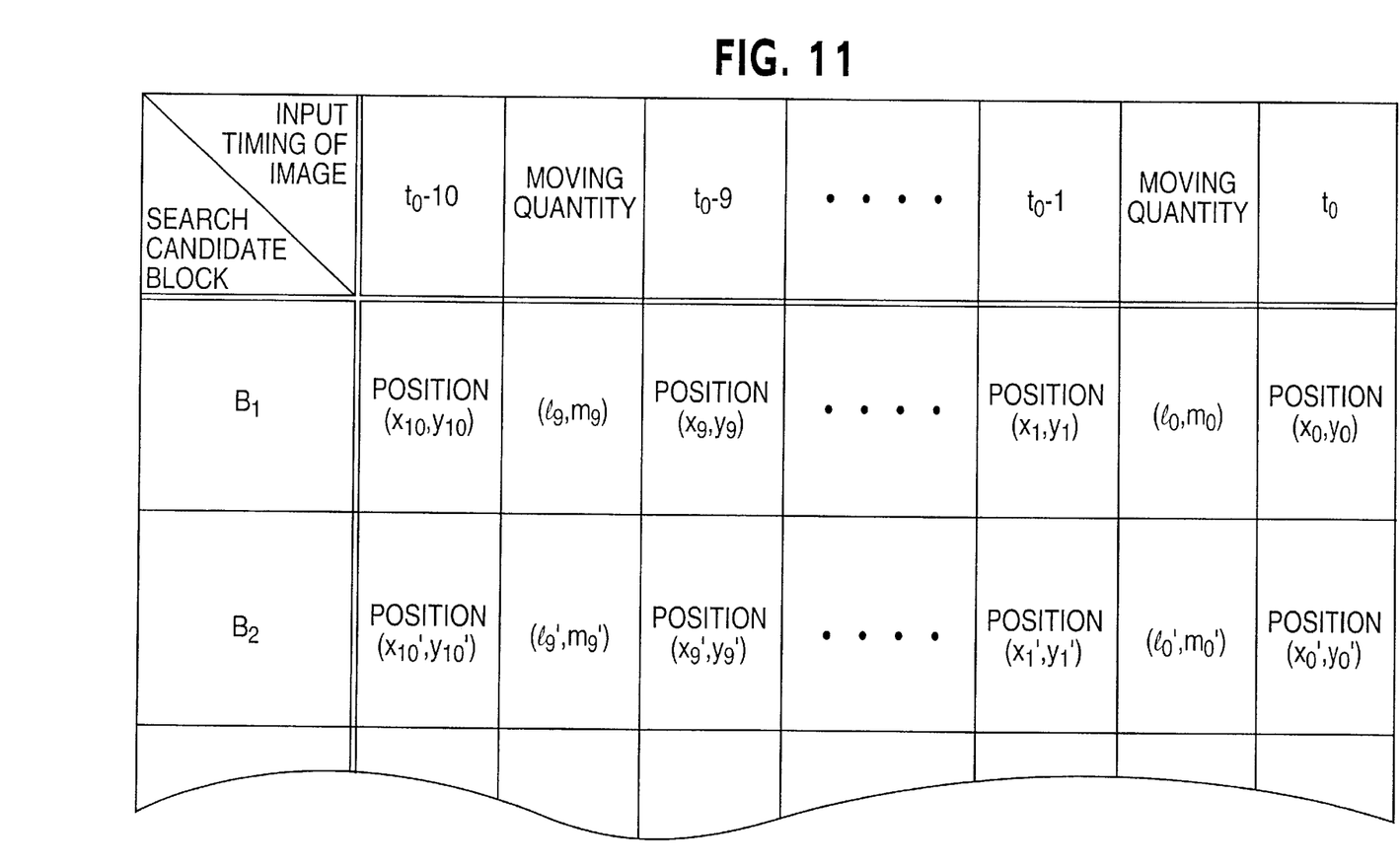
FIG. 11 is a schematic diagram of a memory format of the moving quantity between two images in time series by unit of search candidate.

Next, the moving quantity between the search candidate block in the image (t) and the corresponding block in the image (t+1) is calculated (step c4). Concretely speaking, a relative distance between a position of the search candidate block and a position of the corresponding block on the image is regarded as the moving quantity. The moving quantity and the position of the corresponding block, are sequentially stored in time series by unit of the search candidate block as shown in FIG. 11 (step c5). On the other hand, as for the search candidate block selected from a former input image (for example, the image (t−1) or the image (t−2)), the position in the search candidate block are stored in a time series in the same way as in FIG. 11. Therefore, the corresponding block is searched from the present image (t) according to the position of the search candidate block of the image (t−1) (step c6). In this case, it is possible that the corresponding block is searched for all search candidate blocks selected from all previous images (t−1, t−2, . . . ). However, the calculation cost of the searching process greatly increases. Therefore, the search candidate block selected from just before input image (t−1) is only searched in the present image (t), or the search candidate block including high clear edge elements is sequentially searched in time series images.

In this way, as shown in FIG. 11, the moving quantity between two time series images is stored for the past N frames (for examples, the past ten images) in the moving quantity information buffer 24. By using this information, the moving quantity in a predetermined interval is determined by accumulating the moving quantity between two input timings included in the predetermined interval.

In actual searching, while the search candidate block is shifted in the area of the image (t+1), a block whose correlation value is smallest is detected from the area. If this correlation value is above a threshold, this block is not regarded as the corresponding block. As the standard evaluation, a difference value of the brightness of each pixel or a difference value of the intensity degree of the edge in the block may be used.

Figure 12:
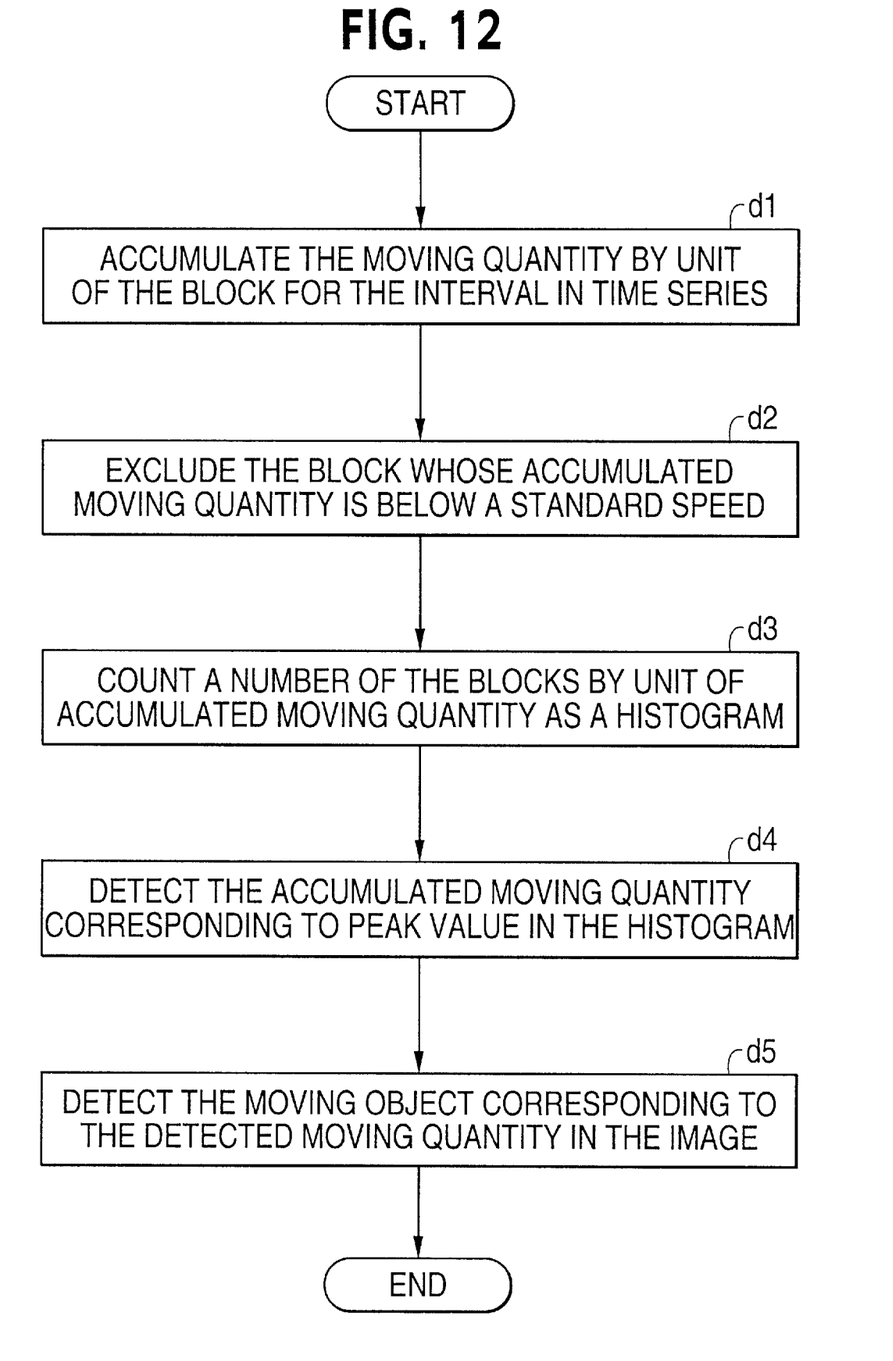
FIG. 12 is a flow chart of processing of a moving object acquisition section in FIG. 1.

FIG. 12 is a flow chart of the processing of the object acquisition section 22. The object acquisition section 22 detects a plurality of neighboring blocks whose moving quantities are almost equal from the image as the moving object.

First, based on the distance between a position of each block and the vanishing point in the image, a time interval to accumulate the moving quantity is determined. Even if two objects are moving at equal speed in three-dimensional space, the nearer to the vanishing point the block of the moving object is, the smaller the moving quantity of the block between time series images is. Therefore, the time interval to accumulate the moving quantity is set long for the block positioned near to the vanishing point, and the time interval to accumulate the moving quantity is set short for the block positioned far from the vanishing point. In the case of two objects moving at the same speed, even if the first block of one moving object is positioned near the vanishing point and the second block of the other moving object is positioned far from the vanishing point in the image, the accumulated moving quantity of the first block is almost equal to the accumulated moving quantity of the second block in the time series images.

In order to control the time interval, it is possible that an interval between input timings of two time series images is changed by unit of the search candidate block. However, the processing to change the interval for each search candidate block is complicated. Therefore, the processing to calculate the moving quantity of the block is executed by unit of the input timing of the image as a minimal interval. The number of intervals to accumulate the moving quantity of the block is changed according to a distance between the block and the vanishing point.

Concretely speaking, assume that the block B1 is positioned near the vanishing point and the block B2 is positioned far from the vanishing point in the image. As shown in FIG. 11, in case of reading out the moving quantity of the block B1 from the moving memory information buffer 24, each moving quantity between the input timing (to) and the input timing (to−α) (for example, α=10) is read out and accumulated. On the other hand, in case of reading out the moving quantity of the block B2, each moving quantity between the input timing (to) and the input timing (to−β) (for example, β=2) is read out and accumulated. In this way, the time interval to accumulate the moving quantity is changed for each search candidate block based on the vanishing point (step d1).

Furthermore, in case of using a car-speed sensor, the time interval may be changed in proportion to the speed of the camera car. For example, in case of high speed, the time interval is set short and in case of low speed, the time interval is set long. In this method, when a plurality of objects are moving at the same speed in the image, the accumulated moving quantity of the block of each moving object is almost equal.

Next, a standard speed as a threshold to exclude a non-moving object is determined if necessary (step d2). For example, in case of the standard speed "V=2", the area of blocks whose moving quantity is below "2" is eliminated from the image. In short, the noise and the stationary object are excluded. The standard speed V is set as one value for the entire area of one image. However, the standard speed may be changed by unit of each area of the one image.

Figure 13:
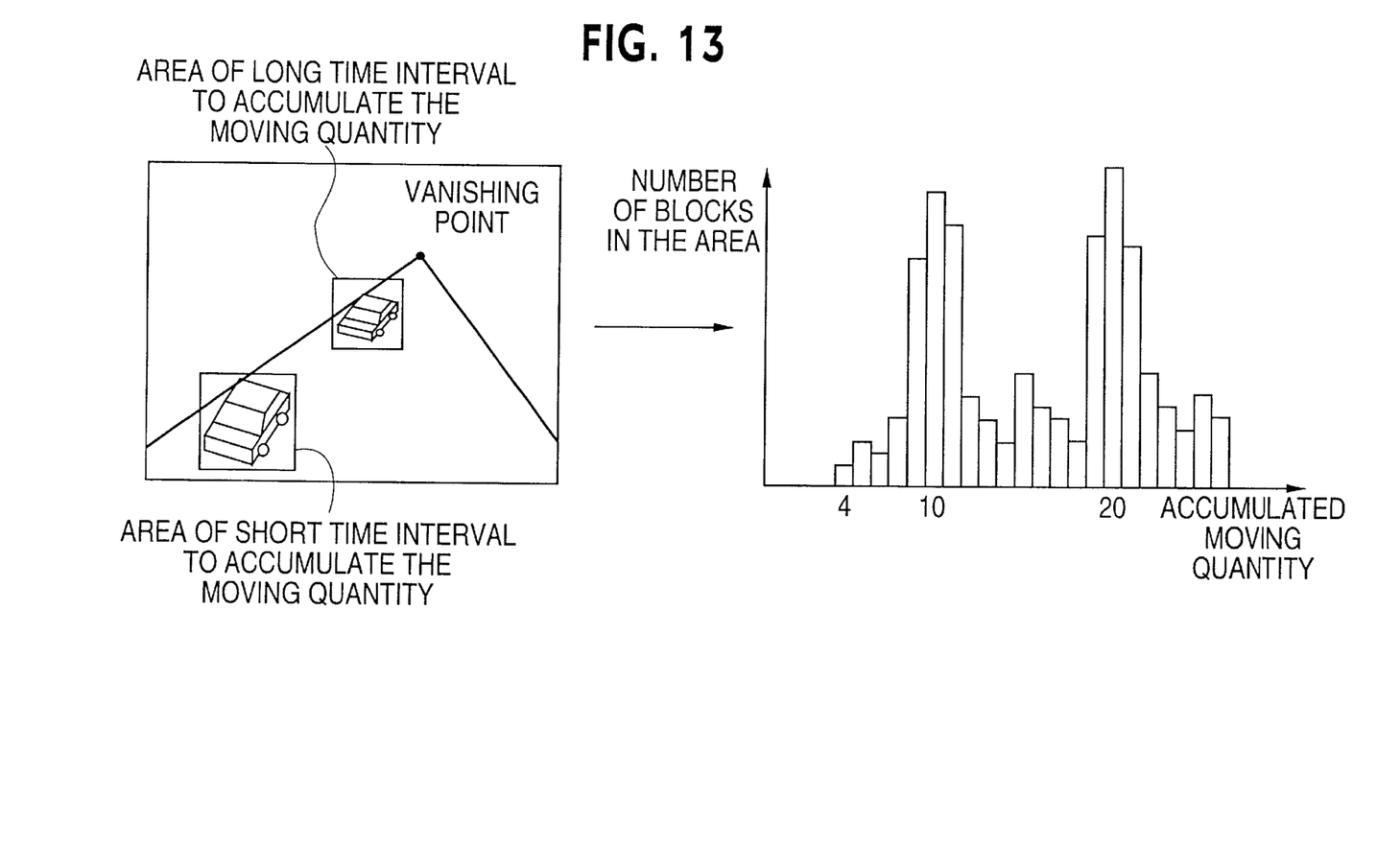
FIG. 13 is a schematic diagram of an example of a histogram showing relation between the number of blocks and the moving quantity in the time series images.

Next, a number of blocks is counted by unit of accumulated moving quantity as a histogram (step d3). As for each area consisting of the search candidate block as shown in the left side of FIG. 13, the number of blocks is counted by unit of the accumulated moving quantity in the histogram as shown in the right side of FIG. 13. In this histogram, the horizontal axis represents the accumulated moving quantity and the vertical axis represents the number of blocks. In case the moving object is in a predetermined area of the image, a peak value of the number of blocks exists in correspondence with a position of the accumulated moving quantity of the moving object. In the histogram shown in the right side of FIG. 13, the peak value exists at the position of the accumulated moving quantities "10" and "20". Therefore, the accumulated moving quantities "10" and "20" are detected as the value representing the block of the moving object (step d4).

In this case, the accumulated moving quantity whose difference from the peak value is below a threshold is additionally detected. For example, in the histogram at the right side of FIG. 13, the accumulated moving quantities "19" and "21" are extracted with the peak value "20" and the accumulated moving quantities "9" and "11" are extracted with the peak value "10".

Figure 14:
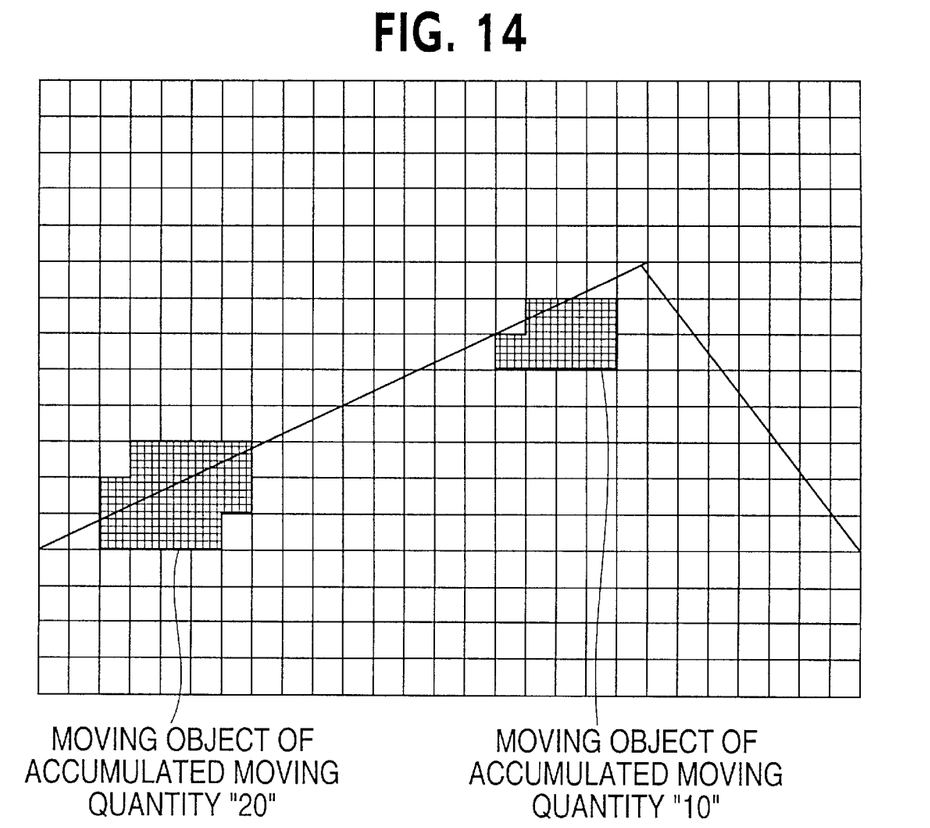
FIG. 14 is a schematic diagram of an example of two moving objects corresponding to the detected moving quantity in the image.

Next, the blocks whose accumulated moving quantity is equal to the peak value (or the additional extracted moving quantity) are detected from the image. A plurality of the blocks whose positions are neighboring each other in the image is united as one moving object (step d5). For example, as shown in FIG. 14, a first area consisting of thirteen blocks, each of which has an accumulated moving quantity of "20", is detected as a first moving object and a second area consisting of seven blocks, each of which has an accumulated moving quantity of "10", is detected as a second moving object.

A memory can be used to store instructions for performing the process described above. Such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. Moving object detection apparatus, comprising:
   image input means for inputting a plurality of images in time series, wherein said image input means is loaded on a vehicle moving along a direction of a white line on a road, each input image including a rear scene to the direction;
   vanishing point detection means for detecting a vanishing point at which a plurality of white line candidates concentrate most from each input image, each white line candidate being an edge line of high brightness value;
   white line elimination means for eliminating the white line from each input image according to a position of the vanishing point; and
   moving object detection means for detecting a moving object from each input image after the white line is eliminated from each input image.

2. The moving object detection apparatus according to claim 1,
   wherein said vanishing point detection means detects edge points in a circumference area of the image, extends the edge points along a slope of the edge points inward the image, detects the extended edge line including other edge points as the white line candidate, and sequentially detects an edge line corresponding to the white line candidate from a next image in time series.

3. The moving object detection apparatus according to claim 2,
   wherein said vanishing point detection means accumulates values corresponding to a position of the white line candidate of each input image onto a parameter space, and detects a peak point of all accumulated values from the parameter space as the vanishing point.

4. The moving object detection apparatus according to claim 1,
   wherein said white line elimination means calculates a theoretical value of each pixel point along a direction from the pixel point to the vanishing point in the image, calculates an actual value of each pixel point along actual edge direction, and calculates a difference between the theoretical value and the actual value of each pixel point.

5. The moving object detection apparatus according to claim 4,
   wherein said white line elimination means compares the difference of each pixel point with a threshold, and eliminates the white line consisting of the pixel points whose difference is below the threshold from the image.

6. The moving object detection apparatus according to claim 1,
   wherein said moving object detection means divides the image without the white line into a plurality of blocks, selects a block including a clear edge element from the plurality of blocks, and pursuitably searches an area corresponding to the selected block from a next image in time series.

7. The moving object detection apparatus according to claim 6,
   wherein said moving object detection means calculates a moving quantity between the block of the image and corresponding area of the next image, and stores the moving quantity between two images in time series for each selected block.

8. The moving object detection apparatus according to claim 7,
   wherein said moving object detection means accumulates the moving quantity of each selected block for a set interval in time series, the set interval being long if the block is positioned near the vanishing point in the image, and the set interval being short if the block is positioned far from the vanishing point in the image.

9. The moving object detection apparatus according to claim 8,
   wherein said moving object detection means counts a number of blocks in correspondence with each accumulated moving quantity as a histogram, a vertical axis of the histogram representing the number of blocks and a horizontal axis of the histogram representing the accumulated moving quantity.

10. The moving object detection apparatus according to claim 9,
    wherein said moving object detection means detects the accumulated moving quantity corresponding to a peak value of the number of blocks from the histogram, and detects an area consisting of neighboring blocks corresponding to the detected accumulated moving quantity from the image as the moving object.

11. A moving object detection method comprising the steps of:
    inputting a plurality of images in time series by a camera loaded on a vehicle moving along a direction of a white line on a road, each input image including a rear scene to the direction;
    detecting a vanishing point at which a plurality of white line candidates concentrate most from each input image, each white line candidate being an edge line of high brightness value;
    eliminating the white line from each input image according to a position of the vanishing point; and
    detecting a moving object from each input image after the white line is eliminated from each input image.

12. The moving object detection method according to claim 11, further comprising the steps of:
    detecting edge points in a circumference area of the image;
    extending the edge points along a slope of the edge points inward the image;
    detecting the extended edge line including other edge points as the white line candidate; and
    sequentially detecting an edge line corresponding to the white line candidate from next image in time series.

13. The moving object detection method according to claim 12, further comprising the steps of:
    accumulating values corresponding to a position of the white line candidate of each input image onto a parameter space; and
    detecting a peak point of all accumulated values from the parameter space as the vanishing point.

14. The moving object detection method according to claim 11, further comprising the steps of:
    calculating a theoretical value of each pixel point along a direction from the pixel point to the vanishing point in the image;
    calculating an actual value of each pixel point along actual edge direction; and
    calculating a difference between the theoretical value and the actual value of each pixel point.

15. The moving object detection method according to claim 14, further comprising the steps of:
    comparing the difference of each pixel point with a threshold; and
    eliminating the white line consisting of the pixel points whose difference is below the threshold from the image.

16. The moving object detection method according to claim 11, further comprising the steps of:
    dividing the image without the white line into a plurality of blocks;
    selecting a block including a clear edge element from the plurality of blocks; and
    pursuitably searching an area corresponding to the selected block from a next image in time series.

17. The moving object detection method according to claim 16, further comprising the steps of:
    calculating a moving quantity between the block of the image and a corresponding area of the next image; and
    storing the moving quantity between two images in time series for each selected block.

18. The moving object detection method according to claim 17, further comprising the step of:
    accumulating the moving quantity of each selected block for a set interval in time series, the set interval being long if the block is positioned near the vanishing point in the image, and the set interval being short if the block is positioned far from the vanishing point in the image.

19. The moving object detection method according to claim 18, further comprising the step of:
    counting a number of blocks in correspondence with each accumulated moving quantity as a histogram, a vertical axis of the histogram representing the number of blocks and a horizontal axis of the histogram representing the accumulated moving quantity.

20. The moving object detection method according to claim 19, further comprising the steps of:

detecting the accumulated moving quantity corresponding to a peak value of the number of the blocks from the histogram; and detecting an area consisting of neighboring blocks corresponding to the detected accumulated moving quantity from the image as the moving object.

21. A computer readable memory containing computer readable instructions, comprising:

instruction means for causing a computer to input a plurality of images in time series by a camera loaded on a vehicle moving along a direction of a white line on a road, each input image including a rear scene to the direction;

instruction means for causing a computer to detect a vanishing point at which a plurality of white line candidates concentrate most from each input image, each white line candidate being an edge line of high brightness value;

instruction means for causing a computer to eliminate the white line from each input image according to a position of the vanishing point; and instruction means for causing a computer to detect a moving object from each input image after the white line is eliminated from each input image.

22. Moving object detection apparatus, comprising:

an image input unit configured to input a plurality of images in time series, wherein said image input unit is loaded on a vehicle moving along a direction of a white line on a road, each input image including a rear scene to the direction;

a vanishing point detection unit configured to detect a vanishing point at which a plurality of white line candidates concentrate most from each input image, each white line candidate being an edge line of high brightness value;

a white line elimination unit configured to eliminate the white line from each input image according to a position of the vanishing point; and a moving object detection unit configured to detect a moving object from each input image after the white line is eliminated from each input image.

* * * * *